(12) United States Patent
Hofmann et al.

(10) Patent No.: US 7,147,249 B2
(45) Date of Patent: Dec. 12, 2006

(54) GAS GENERATOR

(75) Inventors: Achim Hofmann, Polling (DE); Sebastian Bierwirth, Rachmenring (DE); Karsten Schwuchow, Wasserburg (DE)

(73) Assignee: TRW Airbag Systems GmbH, Aschau/Inn (DE)

( * ) Notice: Subject to any disclaimer, the term of this patent is extended or adjusted under 35 U.S.C. 154(b) by 148 days.

(21) Appl. No.: 10/653,510

(22) Filed: Sep. 2, 2003

(65) Prior Publication Data
US 2004/0050281 A1    Mar. 18, 2004

(30) Foreign Application Priority Data
Sep. 3, 2002    (DE) ................. 202 13 555 U

(51) Int. Cl.
*B60R 21/26* (2006.01)
(52) U.S. Cl. .................................. 280/741
(58) Field of Classification Search ............ 102/530, 102/531; 280/736, 740, 741, 742
See application file for complete search history.

(56) References Cited
U.S. PATENT DOCUMENTS

| | | | | |
|---|---|---|---|---|
| 3,724,870 A | * | 4/1973 | Kurokawa et al. | 280/741 |
| 4,215,878 A | * | 8/1980 | Hirbod | 280/737 |
| 5,460,405 A | * | 10/1995 | Faigle et al. | 280/735 |
| 6,149,193 A | * | 11/2000 | Canterberry et al. | 280/741 |
| 2003/0006594 A1 | | 1/2003 | Bergerson et al | |
| 2003/0193178 A1 | * | 10/2003 | Takahara | 280/741 |

FOREIGN PATENT DOCUMENTS

| | | | |
|---|---|---|---|
| DE | 4239167 | | 5/1994 |
| DE | 10161515 | | 9/2002 |
| EP | 0812741 | | 12/1997 |
| EP | 0861762 | | 9/1998 |
| EP | 1004483 | | 5/2000 |
| EP | 1234732 | | 8/2002 |
| GB | 2218698 A | * | 11/1989 |

* cited by examiner

*Primary Examiner*—Faye M. Fleming
(74) *Attorney, Agent, or Firm*—Tarolli, Sundheim, Covell&Tummino LLP

(57) ABSTRACT

A gas generator comprises an elongated outer housing (10) that has end faces and a side wall, at least three stages (12, 14, 16; 112, 114, 116, 118) which can be activated independently of each other, and for each stage (12, 14, 16; 112, 114, 116, 118) an associated igniter unit (32, 34, 36; 132, 134, 136, 138). The igniter units (32, 34, 36; 132, 134, 136, 138) are mounted laterally to the side wall of the outer housing (10).

19 Claims, 4 Drawing Sheets

| 3-stage | stage | | 4-stage | stage |
|---|---|---|---|---|
| 14.3% | C | | 6.7% | D |
| 28.6% | B | | 13.3% | C |
| 42.9% | B+C | | 20.0% | C+D |
| 57.1% | A | | 26.7% | B |
| 71.4% | A+C | | 33.3% | B+D |
| 85.7% | A+B | | 40.0% | B+C |
| 100.0% | A+B+C | | 46.7% | B+C+D |
| | | | 53.3% | A |
| | | | 60.0% | A+D |
| | | | 66.7% | A+C |
| | | | 73.3% | A+C+D |
| | | | 80.0% | A+B |
| | | | 86.7% | A+B+D |
| | | | 93.3% | A+B+C |
| | | | 100.0% | A+B+C+D |

Fig. 3

GAS GENERATOR

TECHNICAL FIELD

The invention relates to an elongated, multiple-stage gas generator.

BACKGROUND OF THE INVENTION

Such multiple-stage gas generators are intended and are being used to adapt the generated quantity of gas to the requirements of a vehicle occupant restraint system in accordance with the situation. Tubular gas generators have an outer housing, the axial length of which is distinctly greater than the diameter. Such tubular gas generators have hitherto been constructed so as to have two stages, the igniters being provided in the axial end walls of the outer housing.

BRIEF SUMMARY OF THE INVENTION

The invention provides a more than two-stage, namely at least three-stage gas generator, which is distinguished by a simple construction. According to the invention, a gas generator comprises an elongated outer housing that has end faces and a side wall, at least three stages which can be activated independently of each other, and for each stage an associated igniter unit. The igniter units are mounted laterally to the side wall of the outer housing preferably from outside and not, as in prior art, provided axially on the end walls of the outer housing. This makes the gas generator according to the invention more compact in its axial extent. Furthermore, it allows a good accessibility to the igniters which do not, as in prior art, have to be already installed when the outer housing is put together and closed. Rather, all the igniter units can be mounted very late to the outer housing, laterally from the exterior, and fastened thereon. Finally, the accessibility to the igniters is also very good, because these protrude laterally, preferably all in the same direction, so that the igniter plugs do not have to be attached to the igniters from different sides. This simplifies the installation in the vehicle, and in addition less space has to be made available for installing the igniter plugs.

Preferably, the igniter units are provided so as to extend radially from the outer housing, i.e. the longitudinal axis of the igniter units is perpendicular to the longitudinal axis of the outer housing.

In the preferred embodiment, in addition all the igniter units are identical in geometry and shape, so that a modular structure can be brought about, at least with regard to the igniter units.

In addition, preferably all the igniter units project in the same direction, i.e. their longitudinal axes lie in one plane and on one side of the outer housing.

The outer housing can have a passage opening for each igniter unit, and for each stage outlet openings for generated gas. The passage opening and the outlet openings can be arranged in diametrically opposite regions of the outer housing. This in fact has the following advantage in a purely pyrotechnic gas generator. On one side, namely in the region of the passage opening, the ignition gas which is produced in the igniter unit flows into the outer housing and arrives into the combustion chamber. From this side, the solid propellant is ignited over a large area. The gas generated on combustion of the solid propellant can emerge from the outer housing in the region of the opposite side. This construction allows a uniform burning of the solid propellant.

The different stages are formed by associated combustion chambers filled with solid propellant, as provided by a preferred embodiment.

Furthermore, the stages could of course also be formed by associated chambers filled with compressed gas or liquid propellant, with one individual igniter unit each being associated thereto.

The outer housing is preferably constructed in modular form, by at least one stage, lying between the axially outer stages, having an outer housing section formed by a tubular part. Through this structural development a kind of unit system is formed. Thereby, from the unit which is available, three-stage or more than three-stage gas generators can be produced very simply. For this, individual cup-shaped outer housing end sections are used, which in each case form one stage. One or more prefabricated outer housing sections, which have identical connection geometries, are placed therebetween.

Between the outer housing sections, disc-shaped axial dividing walls are provided, which all preferably have the same geometry and dimensions.

If the gas generator according to the invention has three stages, the gas generating outputs of these stages are preferably approximately $1/7$, $2/7$ and $4/7$ of the total gas generating output of the gas generator. Hereby, already very fine graduations can be achieved.

Even more finely graduated is a gas generator with four stages, the gas generating outputs of which amount to approximately 7%, 13%, 27% and 53% of the total gas generating output of the gas generator.

Through the thus graduated three- or four-stage gas generators, a continuously adjustable gas generator, as is partly intended, is almost superfluous, because depending on which stage or stages is/are ignited and possibly depending on the chronological intervals at which these stages are ignited, gas outflow characteristics are produced, which differ slightly from each other.

BRIEF DESCRIPTION OF THE DRAWINGS

FIG. 3 shows a table which indicates the different gas generating outputs of the two gas generators which are illustrated.

DETAILED DESCRIPTION OF THE PREFERRED EMBODIMENTS

Figure 1:
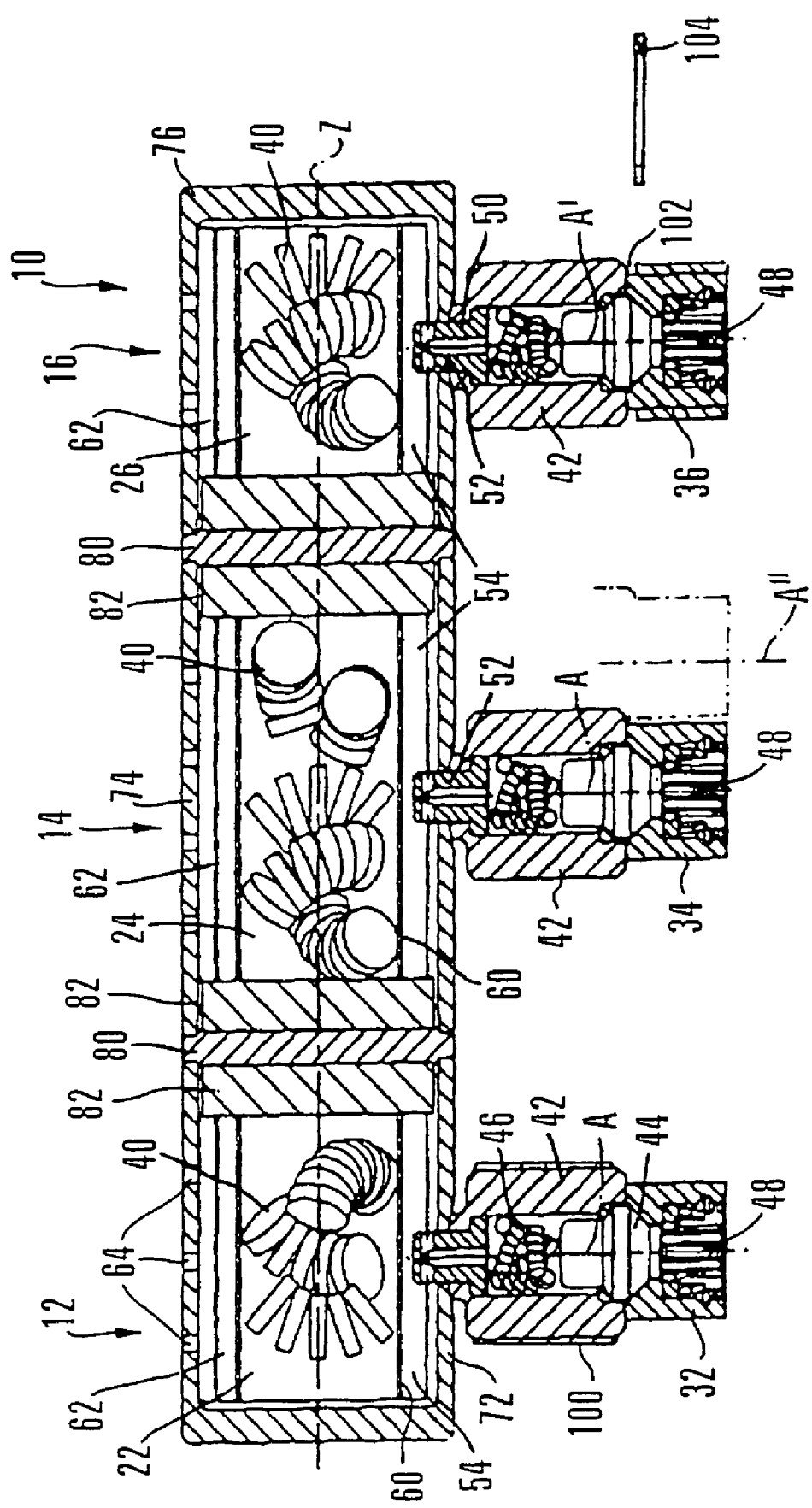
FIG. 1 shows a longitudinal sectional view through a three-stage gas generator according to the invention.

In FIG. 1 there is illustrated a three-stage gas generator with an elongated, tubular, cylindrical outer housing 10.

The stages are designated by 12, 14 and 16 and have their own separate combustion chambers 22, 24, 26 and associated igniter units 32, 34, 36, respectively. In each combustion chamber 22, 24, 26 a quantity of solid propellant 40 is contained, which can be ignited by the associated igniter unit 32, 34, 36.

The individual stages 12, 14, 16 have a different gas generating output which depends directly on the quantity of solid propellant contained in the associated combustion chamber 22, 24, 26. In FIG. 3 the gas generating output of each stage is shown on the left half. The combustion chamber 26 contains approximately 1/7, the combustion chamber 22 approximately 2/7 and the combustion chamber 24 approximately 4/7 of the total quantity of solid propellant.

All the igniter units 32, 34, 36 are identical in construction, have the same geometry and the same dimensions. In addition, they have an elongated igniter housing 42 with a central axis A which intersects the central axis Z of the outer housing 10 at right angles. The igniter units 32, 34, 36 are therefore radial to the outer housing 10 and are mounted laterally externally to it, i.e. fastened thereon. In each igniter housing 42, an igniter 44 and a booster charge 46 are housed. To the rear side of the igniter 44, electrical contacts 48 are provided, to which an igniter plug (not shown) is to be connected. Owing to the arrangement of the igniter units 32, 34, 36, these contacts 48 face away from the outer housing 10. As can also be seen from FIG. 1, all the igniter units 32, 34, 36 lie in one plane, with respect to their axes A, and lie on the same side of the outer housing 10.

The igniter units 32, 34, 36 each have on the side facing the outer housing 10 a nozzle-shaped insert 50, which projects through a passage opening 52 in the outer housing 10 into a distributor chamber 54. The distributor chamber 54 is an elongated chamber which is of small width and height and extends across the entire length of the associated combustion chamber 22, 24, 26. It is formed by an indentation of a cylindrical insert 60 consisting of a perforated sheet, which defines the combustion chamber wall and which lies, except for two indentations, against the inner face of the outer housing 10. The first indentation of this insert forms the distributor chamber 54. The second indentation, which lies diametrically opposite the first indentation, forms an expansion space 62, in the region of which outflow openings 64 are provided in the outer housing 10. The outflow openings 64 are therefore arranged in a region which lies diametrically opposite the associated passage opening 52.

The modular structure of the gas generator is also produced inter alia from the sub-division of the outer housing 10. Each stage in fact has its own section of the outer housing, formed by a separate part. The two axially outer stages 22 and 26 have cylindrical tubes 72, 76, closed on the outer end face, for the formation of the outer housing 10 in sections. The central stage 24 has a tube 74 which is open axially on both sides and coupled to the tubes 72, 76 via two identical disc-shaped dividing walls 80.

So-called filling bodies 82 close the combustion chambers 22, 24, 26 to adjacent stages.

Each individual stage represents a closed unit which may be pre-assembled.

After filling of each combustion chamber 22, 24, 26 with the required quantity of solid propellant 40, the combustion chamber is closed by means of the filling body 82 and can thus be stored.

Numerous different stages are thus produced, which are then selectively combined with each other.

The finished mounted gas generator is then installed into the vehicle. As the contacts 48 on the rear face always point to the same side, the gas generator can be equipped with the igniter plugs very quickly and simply.

Figure 4:
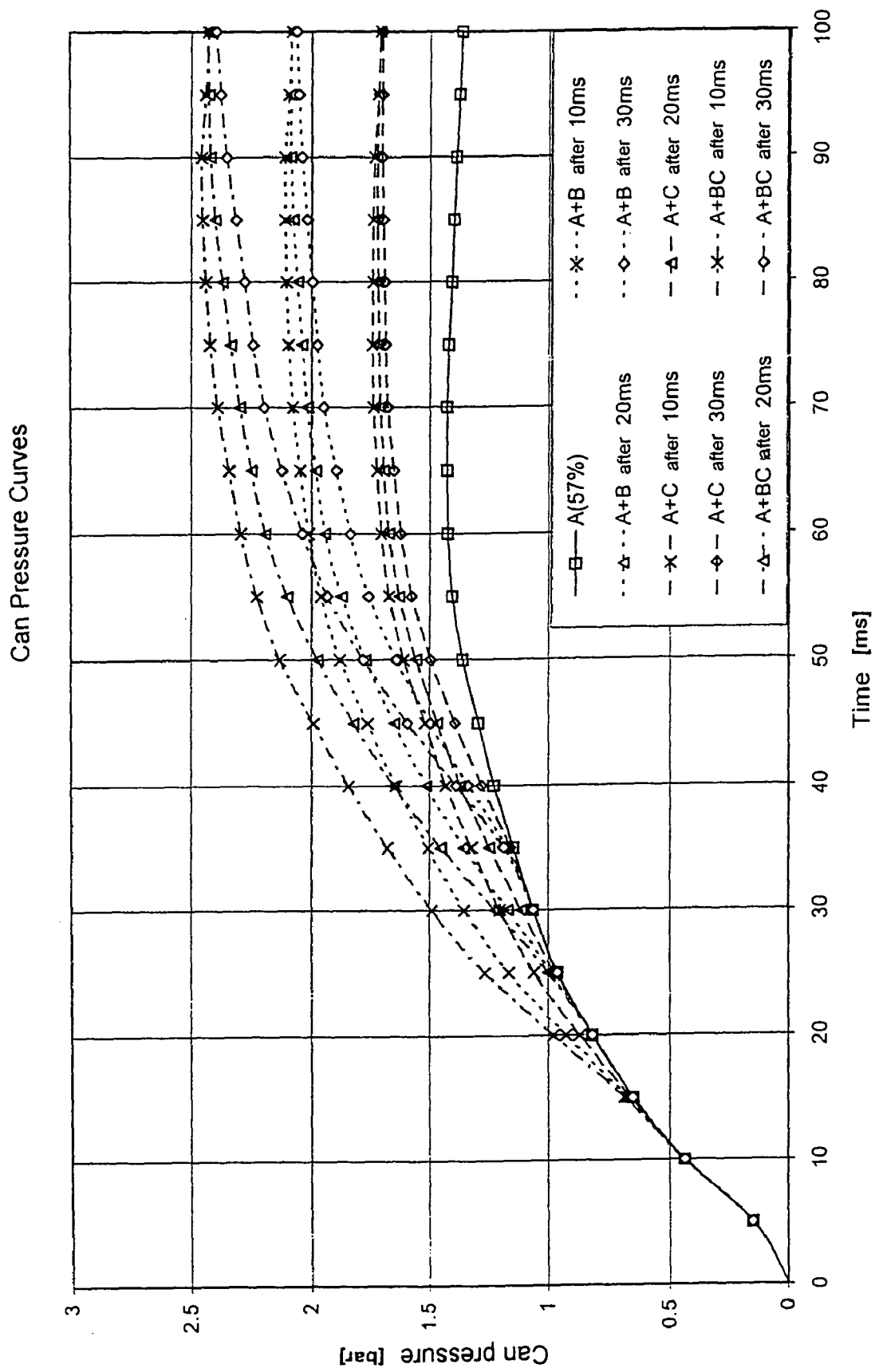
FIG. 4 shows a diagram which indicates the can pressure profile in the gas generator according to FIG. 1 as a function of the ignited stages.

In the case of restraint, it is determined by the sensors, e.g. depending on the position of the occupant, the mass of the occupant, the severity of the accident or the course of the accident with intercalation of a control unit, whether all the stages 22, 24, 26 have to be triggered and, if necessary, which stage is to be activated at which time. Dependent thereon, entirely different so-called can pressure profiles can be achieved, as is indicated by way of example in FIG. 4 for the case where one or more stages of the gas generator according to FIG. 1 are ignited. In FIG. 3 it can also be seen which quantity of gas can be produced in relation to the entire quantity of gas generated on ignition of one or more stages. It can be seen here very well that very fine graduations are able to be achieved.

Apart from the can pressure curves shown in FIG. 1, numerous other curves can also be produced with the gas generator shown in FIG. 1, by for example the stages B and C being ignited individually or the stages B or C first being ignited, if optionally the other stage or additionally stage A is ignited in some cases. Incidentally, the stages A, B, C furthermore correspond to the stages 24, 22 and 26.

Figure 2:
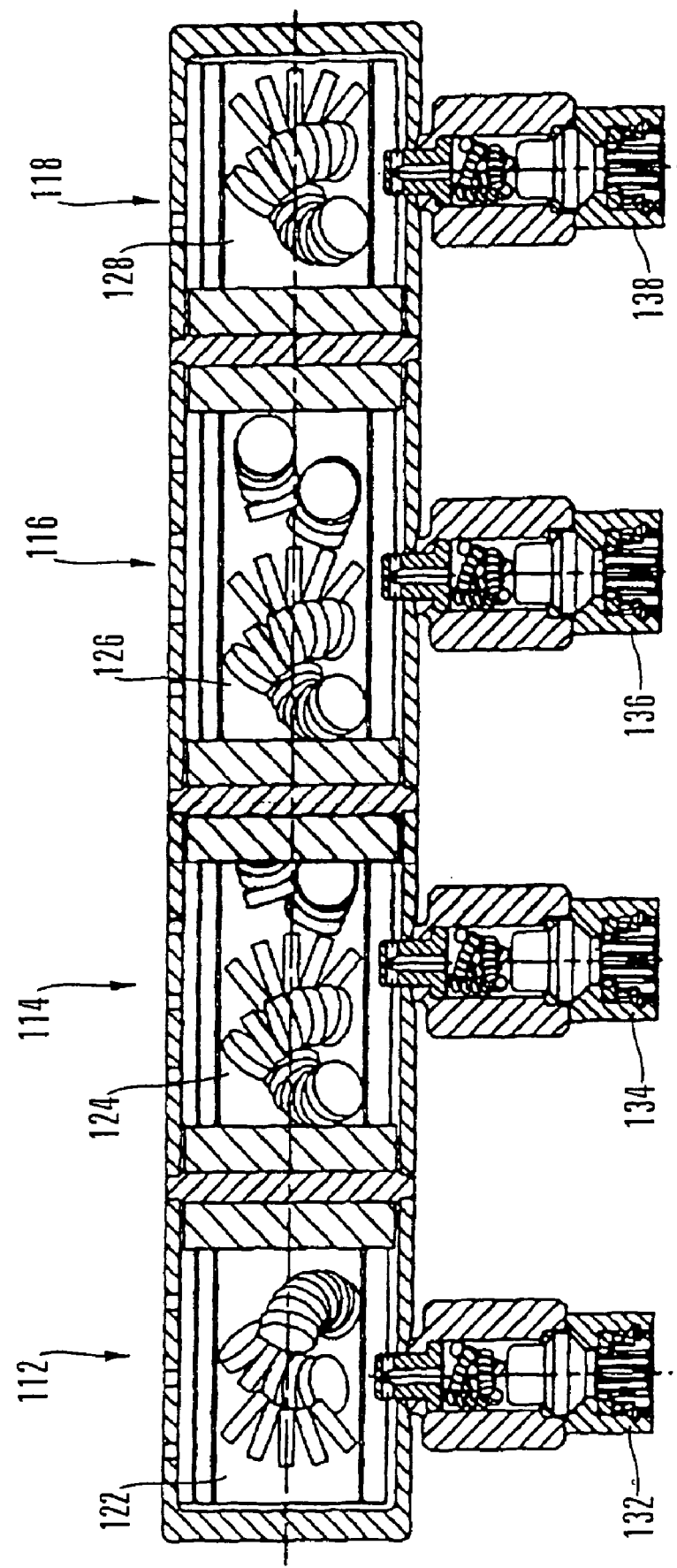
FIG. 2 shows a longitudinal sectional view through a four-stage gas generator according to the invention.

The embodiment shown in FIG. 2 of a four-stage gas generator corresponds substantially to the one illustrated in FIG. 1 with respect to the modular construction. Corresponding parts already introduced in connection with FIG. 1 have a reference number increased by 100. Each stage 112, 114, 116 and 118 has a different gas generating output, as is also represented in FIG. 3 on the right half. The stage 116 corresponds to stage A in FIG. 3 and has 53% of the total gas generating output of the gas generator; stage 114 corresponds to stage B in FIG. 3 and has approximately 27% of the total gas generating output; stage 112 corresponds to stage C in FIG. 3 and has approximately 13% of the total gas generating output, and stage 118 corresponds to stage D in FIG. 3 and has approximately 7% of the total gas generating output of the generator.

In quite general terms, with the at least three-stage gas generator, at least two stages should have different gas generating outputs, in order to be able to vary the gas output of the entire gas generator. Furthermore, it would be possible to provide solid propellant 40 with different geometries in individual combustion chambers. For example, the tablets could be larger in one stage than those in the other stage, whereby different filling quantities can be achieved. Also, different charge mixtures for individual chambers would be conceivable.

In order to prevent, for example, the gas generator shown in FIG. 1 from being installed in the vehicle turned through 180 degrees (i.e. turned from left to right) and the igniters being accordingly connected incorrectly, an installation position coding means can be provided. This is very simple to produce if, in contrast to the illustrated embodiment, the igniter units, viewed transversely to the longitudinal extent of the gas generator, are arranged asymmetrically to the outer housing 10 and/or asymmetrically to each other. For example, the central igniter unit 34 could be moved from the center further to the right, as indicated by the central axis A". Then the gas generator could only be installed in one position, if for example corresponding mountings for the igniter units 32, 34, 36 are provided on the vehicle side.

The igniter housings 32 can be constructed as fastening means for arresting the entire gas generator in a gas bag module or directly in the vehicle and designed as corresponding fastening means. For example, a thread 100, a groove 102 for the introduction of a securing ring 104 can be provided on the igniter housing 42 or a so-called 3K profile. A 3K profile is a profile which is not circular in cross-section, which has so-called circle key profiles on the periphery, i.e. sections which have a continuously increasing distance from the central axis in peripheral direction. The 3K profile is described in DE 42 09 153 A1, for example.

The invention claimed is:

1. A gas generator comprising an elongated outer housing (10) that has end faces and a tubular side wall, at least three gas generating stages (12, 14, 16; 112, 114, 116, 118) which can be activated independently of each other, and each stage (12, 14, 16; 112, 114, 116, 118) having an associated igniter unit (32, 34, 36; 132, 134, 136, 138), said igniter units (32, 34, 36; 132, 134, 136, 138) being mounted laterally to said tubular side wall of said outer housing (10).

2. The gas generator according to claim 1, characterized in that said igniter units (32, 34, 36; 132, 134, 136, 138) are provided so as to extend radially from said outer housing (10).

3. The gas generator according to claim 1, characterized in that said igniter units (32, 34, 36; 132, 134, 136, 138) are identical in construction.

4. The gas generator according to claim 1, characterized in that said igniter units (32, 34, 36; 132, 134, 136, 138) all have an identical orientation with respect to said outer housing.

5. The gas generator according to claim 1, characterized in that each igniter unit (32, 34, 36; 132, 134, 136, 138) has rear, electrical contacts (48) facing away from said outer housing (10).

6. The gas generator according to claim 1, characterized in that said outer housing (10) has a passage opening (52) for each igniter unit (32, 34, 36; 132, 134, 136, 138) and outlet openings (64) for generated gas for each stage (12, 14, 16; 112, 114, 116, 118), said passage opening (52) and said outlet openings (64) being arranged in diametrically opposite regions of said outer housing (10).

7. The gas generator according to claim 1, characterized in that said stages (12, 14, 16; 112, 114, 116, 118) are formed by associated combustion chambers (22, 24, 26; 122, 124, 126, 128) filled with solid propellant (40).

8. The gas generator according to claim 1, characterized in that said outer housing (10) is modular in construction, by at least one stage (14, 114, 116), lying between axially outer stages, having an outer housing section formed by a tubular part.

9. The gas generator according to claim 8, characterized in that disc-shaped, axial dividing walls (80) are provided between said outer housing sections.

10. The gas generator according to claim 9, characterized in that all said axial dividing walls (80) have the same geometry and dimensions.

11. The gas generator according to claim 1, characterized in that it has three stages (12, 14, 16), a gas generating output of which amounts to approximately 1/7, 2/7 and 4/7 of a total gas generating output of said gas generator.

12. The gas generator according to claims 1, characterized in that it has four stages (112, 114, 116, 118), a gas generating output of which amounts to approximately 7%, 13%, 27% and 53% of a total gas generating output of said gas generator.

13. The gas generator according to claim 1, characterized in that at least two stages (12, 14, 16; 112, 114, 116, 118) have at least one of different gas generating outputs, solid propellant (40) of different geometry and different charge mixtures.

14. The gas generator according to claim 1, characterized in that said igniter units have igniter housings (42) which, viewed transversely to a longitudinal extent of said gas generator, are arranged asymmetrically to said outer housing (10).

15. The gas generator according to claim 1, characterized in that said igniter units have igniter housings (42) which, viewed transversely to a longitudinal extent of said gas generator, are arranged asymmetrically to each other.

16. The gas generator according to claim 1, characterized in that said igniter have associated igniter housings (42) which are constructed as fastening means for arresting said gas generator in a module.

17. A gas generator comprising:

an elongated outer housing (10) that has end faces and a side wall extending between said end faces;

at least three gas generating stages (12, 14, 16; 112, 114, 116, 118) which can be activated independently of each other to generate gas; and each stage (12, 14, 16; 112, 114, 116, 118) having a source of gas in said housing which source when activated produces gas, each stage also having an associated igniter unit (32, 34, 36; 132, 134, 136, 138) for activating an associated gas source, said igniter units (32, 34, 36; 132, 134, 136, 138) being mounted on said side wall of said outer housing (10) and spaced apart from said end faces and spaced apart from each other, wherein each of said igniter units is mounted on said side wall of said outer housing (10) such that the longitudinal axis of each of the igniter units is perpendicular to the longitudinal axis of the outer housing.

18. The gas generator of claim 17, wherein all of the distances between adjacent igniter units are not the same.

19. The gas generator according to claim 17, wherein each of said igniter units comprises an igniter, wherein the entire igniter for each of said igniter units is spaced apart outwardly from said side wall of said outer housing.

* * * * *